US007809773B2

(12) United States Patent
Horowitz et al.

(10) Patent No.: US 7,809,773 B2
(45) Date of Patent: Oct. 5, 2010

(54) COMMENT FILTERS FOR REAL-TIME MULTIMEDIA BROADCAST SESSIONS

(75) Inventors: Steven Horowitz, Oakland, CA (US); Marc Davis, San Francisco, CA (US); Malcolm Slaney, Sunnyvale, CA (US)

(73) Assignee: Yahoo! Inc., San Jose, CA (US)

( * ) Notice: Subject to any disclaimer, the term of this patent is extended or adjusted under 35 U.S.C. 154(b) by 387 days.

(21) Appl. No.: 11/963,327

(22) Filed: Dec. 21, 2007

(65) Prior Publication Data

US 2009/0164484 A1 Jun. 25, 2009

(51) Int. Cl.
*G06F 17/30* (2006.01)
(52) U.S. Cl. .................................... 707/805; 707/913
(58) Field of Classification Search ............. 707/803, 707/913, 999.107, 805; 709/206; 725/135–136
See application file for complete search history.

(56) References Cited

U.S. PATENT DOCUMENTS

| 2004/0221323 | A1 | 11/2004 | Watt .......................... 725/135 |
| 2005/0234958 | A1 | 10/2005 | Sipusic et al. .............. 707/102 |
| 2006/0259923 | A1* | 11/2006 | Chiu ........................... 725/24 |
| 2007/0282887 | A1* | 12/2007 | Fischer et al. .............. 707/102 |
| 2008/0235213 | A1* | 9/2008 | Gura ............................. 707/5 |
| 2008/0235349 | A1* | 9/2008 | Caspi et al. ................. 709/218 |
| 2009/0106376 | A1* | 4/2009 | Tom et al. ................... 709/206 |
| 2009/0198566 | A1* | 8/2009 | Greenberg .................. 705/10 |

FOREIGN PATENT DOCUMENTS

KR 10-2007-0105722 10/2007

OTHER PUBLICATIONS

Notification of Transmittal of the International Search Report and the Written Opinion of the International Searching Authority, or the Declaration, International Application No. PCT/US2008/083172, Mailed Jun. 26, 2009, 11 pages.
Schafer et al., "Meta-Recommendation Systems: User-Controlled Integration of Diverse Recommendations," Proceedings of the Eleventh International Conference on Information and Knowledge Management, 2002, pp. 43-51.
Marques et al., "MUSE: A Content-Based Image Search and Retrieval System Using Relevance Feedback," Multimedia Tools and Applications, 2002, 30 pages.
Korean Intellectual Property Office, Korean Patent Abstracts, Application No. 1020060038265, Publication No. 1020070105722, Published Oct. 31, 2007, Received Jul. 13, 2009, 2 pages.
R. Schroeter, J. Hunter, and D. Kosovic. "FilmEd—Collaborative Video Indexing, Annotation and Discussion Tools Over Broadband Networks" Proceedings of the Multimedia Modelling Conference 2004. Brisbane, Australia. Jan. 2004. pp. 346-353. doi:10.1109/MULMM.2004.1265006.

* cited by examiner

*Primary Examiner*—Cheryl Lewis
(74) *Attorney, Agent, or Firm*—Baker Botts L.L.P.

(57) ABSTRACT

Methods, apparatuses and systems directed to filtering comments presented to users in connection with multimedia content, such as video and audio content. In a particular implementation, there are two types of users of this system. A writer comments on sections of a real-time multimedia stream, while readers or viewers observe the discussion embodied by the comments that are displayed.

22 Claims, 7 Drawing Sheets

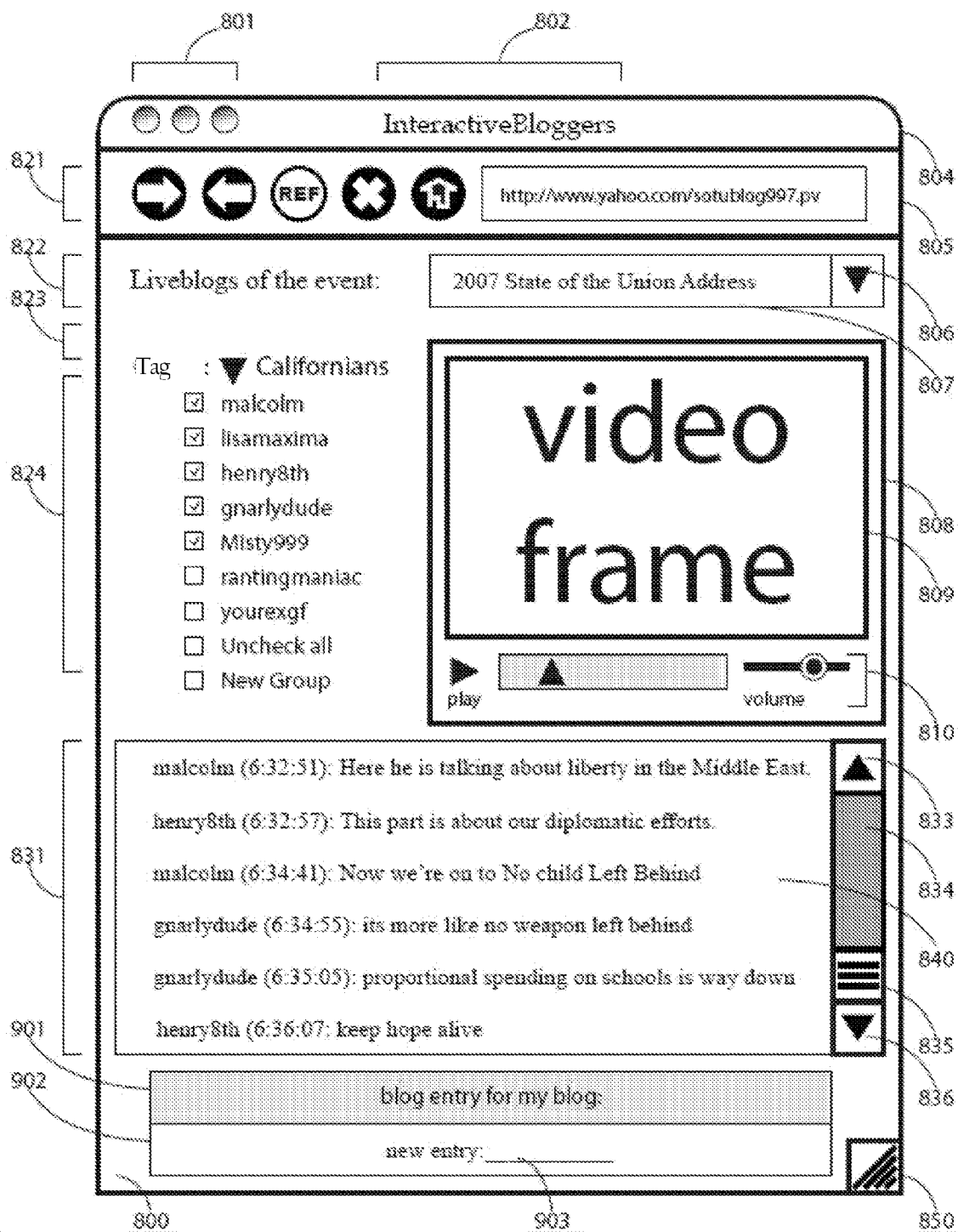
Fig._4

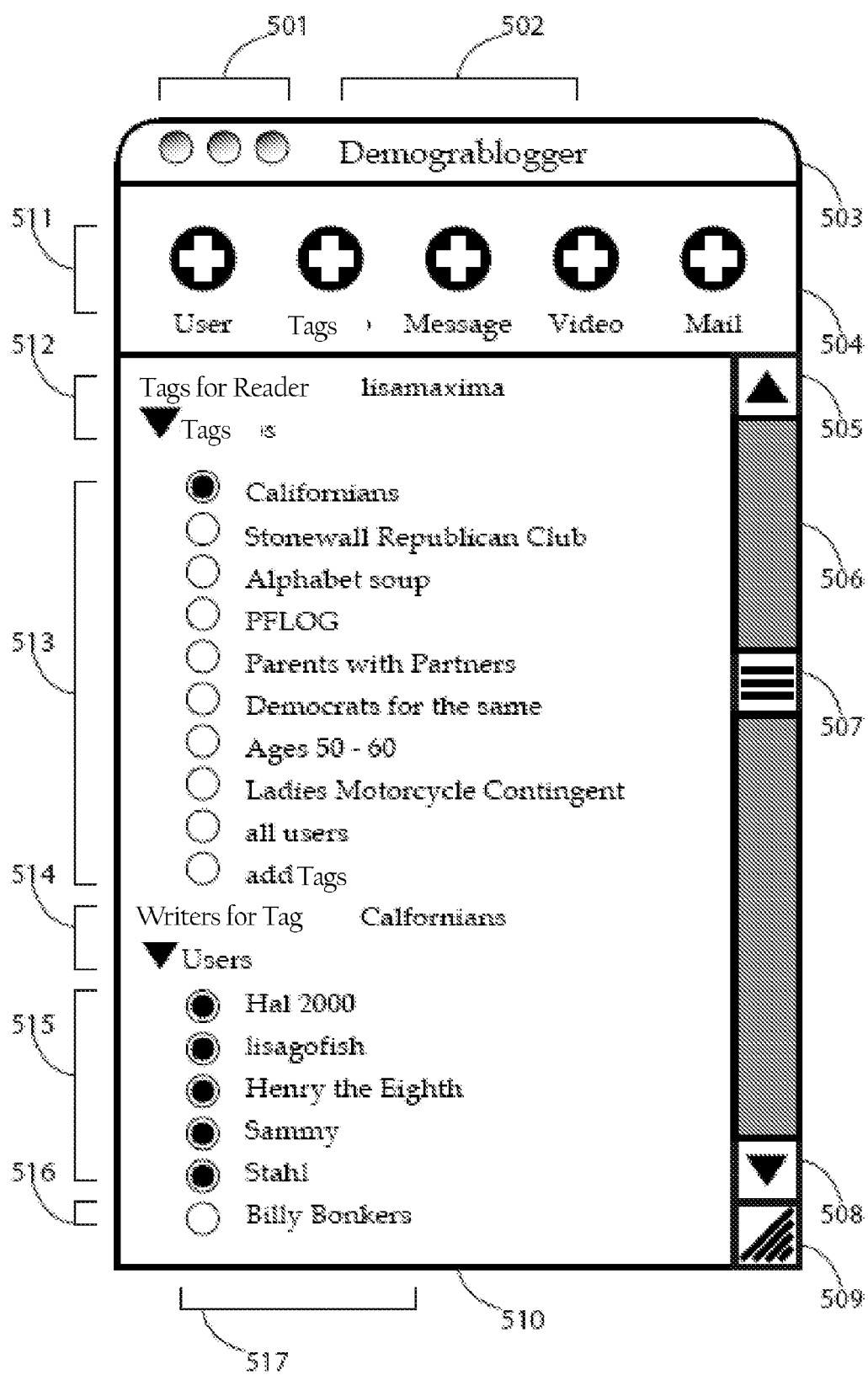
Fig._5

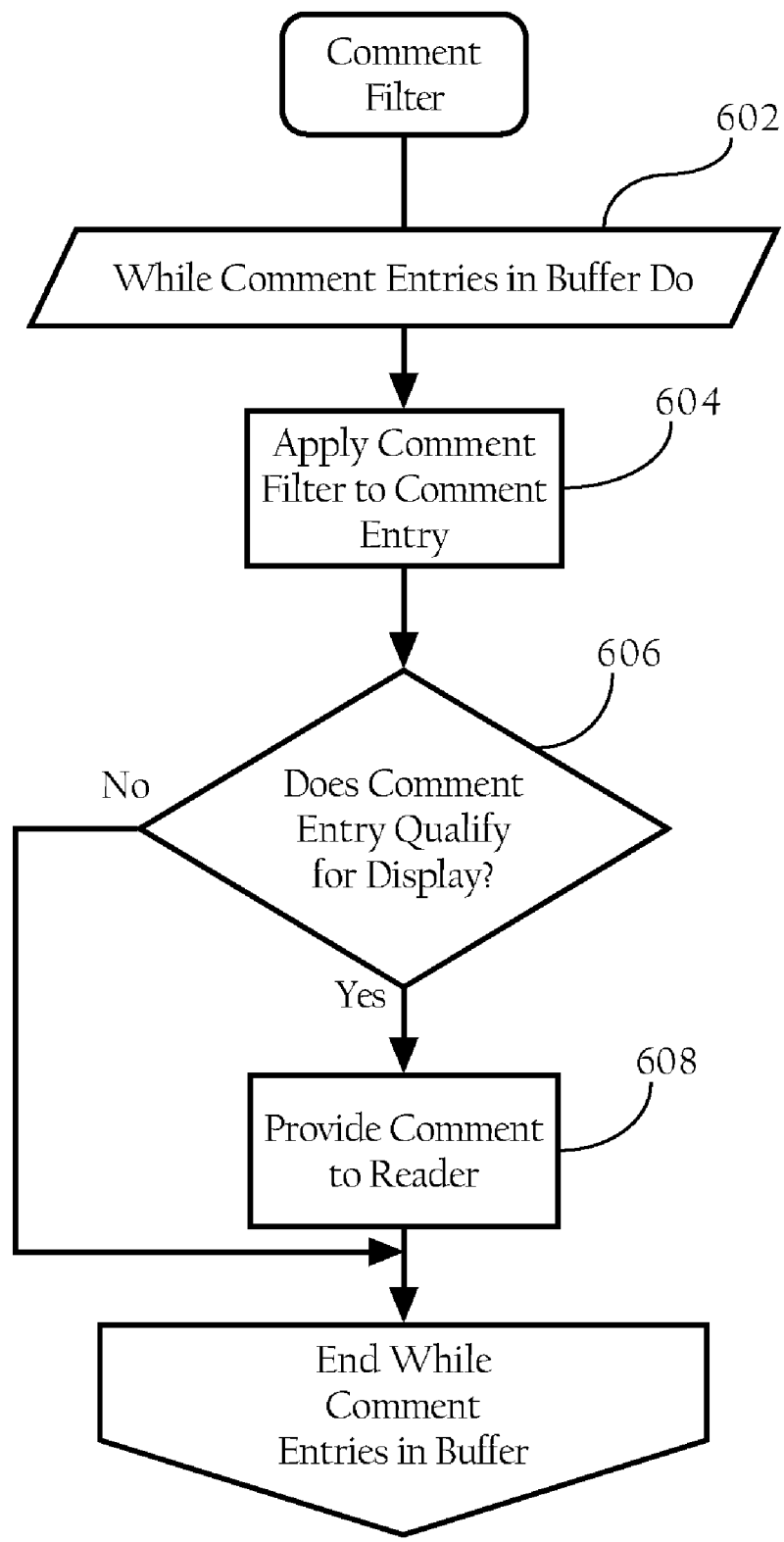
Fig._6

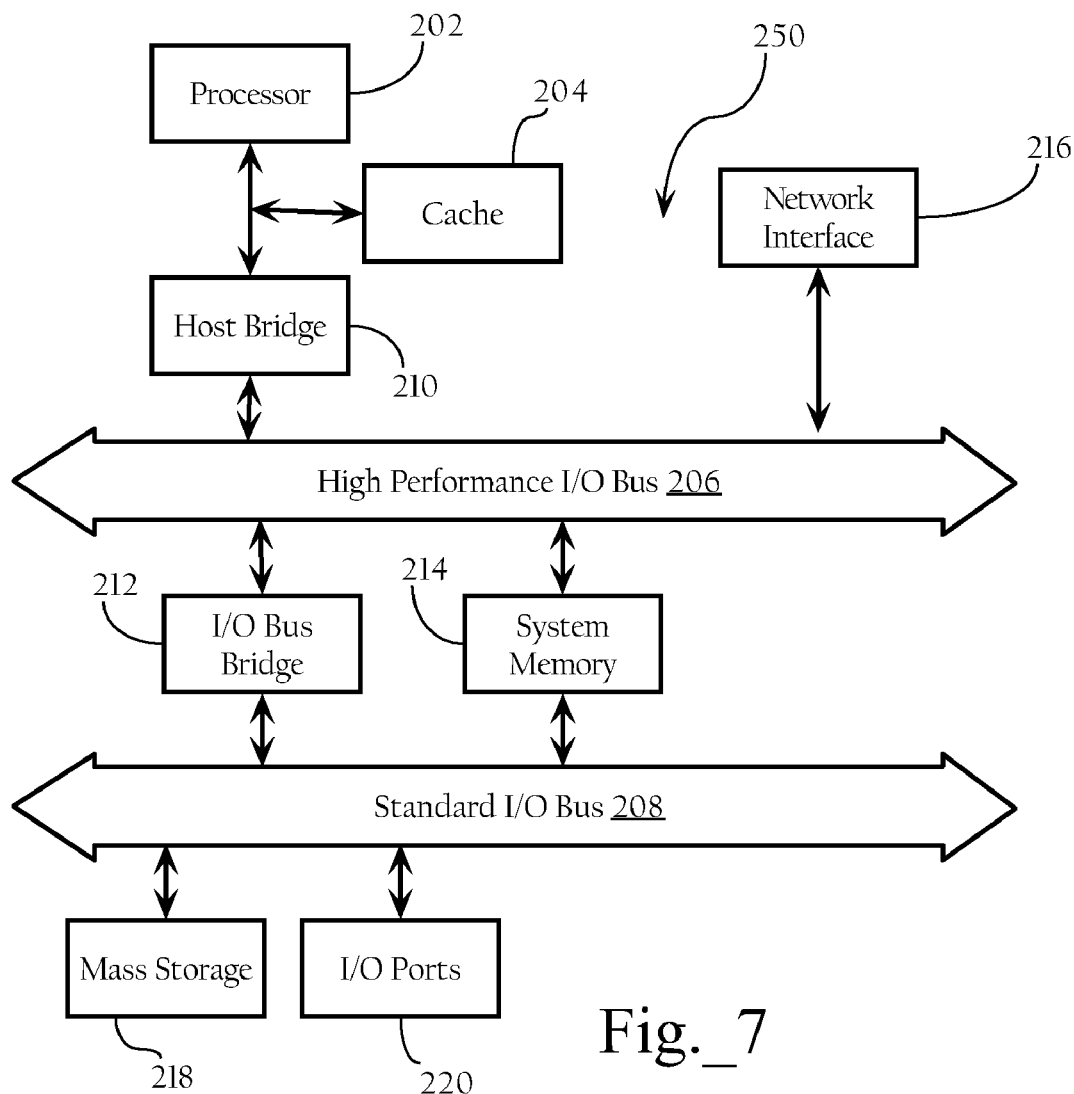
Fig._7

COMMENT FILTERS FOR REAL-TIME MULTIMEDIA BROADCAST SESSIONS

TECHNICAL FIELD

The present disclosure relates generally to a system to create interactive commentary over a network in connection with an audio, video or other multimedia broadcast, where users can configure a filter that controls display of the interactive commentary.

BACKGROUND

Interactive systems connected wide area networks, such as the Internet, have steadily evolved into vibrant mediums for social interaction and accessing digital media. Streaming media refers to multimedia content that is constantly received by, and normally displayed to, one or more end-users while it is being delivered by the provider. Multimedia streams can be provided live or on-demand. Some network providers host live streaming events where users may perceive streaming multimedia content, such as audio and video, and simultaneously view comments submitted by a subset of the users. These live streaming events, together with the recorded comments, can also be re-played on-demand.

SUMMARY

The present invention provides methods, apparatuses and systems directed to filtering comments presented to users in connection with multimedia content, such as video and audio content. In a particular implementation, there are two types of users of this system. A writer comments on sections of a real-time multimedia stream, while readers or viewers observe the discussion embodied by the comments that are displayed. A person might be both a writer and a reader, but their functions are different and are discussed separately here. A particular implementation of the invention provides an interactive mechanism for writers to comment on an event reflected in a multimedia stream in real time, and for readers or viewers to configure filters that control the types of comments that are presented to them, either in real time as the event transpires or in an offline viewing mode. Readers or viewers see the same event as the writers and can select the type of comments, or properties of the writers, or many other attributes of the writer and the comments.

DESCRIPTION OF THE DRAWINGS

FIGS. 2 thru 5 illustrate example graphical user interfaces.

FIG. 6 is a flow chart illustrating an example comment filtering method.

FIG. 7 sets forth an example computing system architecture.

DESCRIPTION OF PREFERRED EMBODIMENT(S)

The following embodiments and aspects thereof are described and illustrated in conjunction with systems, apparatuses and methods meant to be exemplary and illustrative, not limiting in scope.

Implementations of the invention allow a user to configure filters that control the display of comments entries transmitted by a one or more comment writers in connection with a multimedia stream or broadcast of audio or video content. In one implementation, a user may configure a filter based on one or more attributes of the comment writers (such as user names, demographic data, user ratings, and the like), or the submitted comments (such as keywords or tags).

A. Network and Operating Environment

Figure 1:
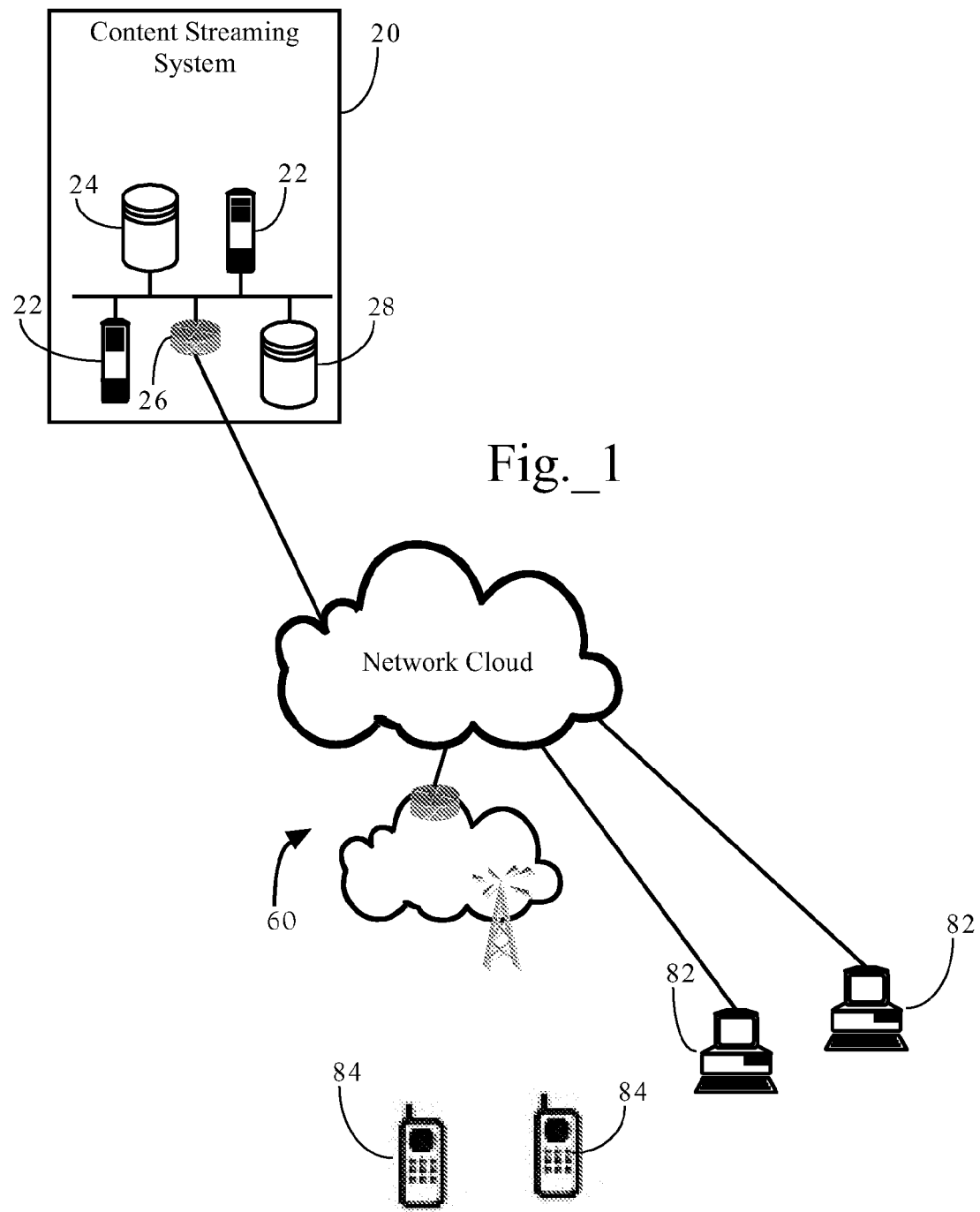
FIG. 1 illustrates an example network environment in which particular implementations may operate.

Particular implementations of the invention operate in a wide area network environment, such as the Internet, including multiple network addressable systems. As FIG. 1 shows, network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like.

As FIG. 1 illustrates, a particular implementation of the invention can operate in a network environment comprising content streaming system 20 and one or more client host systems 82, 84. Still further, implementations of the invention may operate in network environments that include multiples of one or more of the individual systems and sites disclosed herein. Client host systems 82, 84 are operably connected to the network environment via a network service provider or any other suitable means.

Content streaming system 20 is a network addressable system that is operative to broadcast or multicast multimedia content to one or more remote hosts. Content streaming system 20 is also operative to receive comments submitted by users of the remote hosts, and distribute the comments to the remote hosts concurrently with multimedia content.

Content streaming system 20, in one implementation, comprises one or more physical servers 22 and content data store 24. The one or more physical servers 22 are operably connected to computer network 60 via a router 26. The one or more physical servers 22 host functionality that allows users to select a live streaming event, or archived multimedia content, for display. In one implementation, the functionality hosted by the one or more physical servers may include web or HTTP servers, streaming media servers, FTP servers, and the like. In a particular implementation, one or more of the servers 22 hosts a comment filter engine that selective provides comments to viewers based on one or more filter attributes that they each may have configured.

Content data store 24 stores content as digital content data objects. A content data object or content object, in particular implementations, is an individual item of digital information typically stored or embodied in a data file or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., Java Applets, JavaScript objects, AJAX objects), and the like. Structurally, content data store 24 connotes a large class of data storage and management systems. In particular implementations, content data store 24 may be implemented by any suitable physical system including components, such as database servers, mass storage media, media library systems, and the like.

B. User Roles

There are two types of users of this system. A writer comments on sections of multimedia content, such as a real-time video, while readers or viewers observe the discussion. A person might be both a writer and a reader, but their functions are different and are discussed separately here.

B.1. Writers

A writer creates content (typically comment text) in real-time that relates to a real-time event as embodied in multimedia content provided by content streaming system 20. The comments submitted by writers may be reactions to an event, a description of the event and the like. Each writer has a unique identifier that content streaming system 20 associates with them. Content streaming system 20 may also maintain metadata in connection with one or more of the writers, such as user profile data and demographic data. More elementally, content streaming system 20 maintains one or more tags or keywords for a writer. For example, the tags may describe the political leanings of a writer, such as "Liberal", "Republican", or "Democrat." Some tags may be manually configured by the writer. The system might supply additional tags based on analysis or profiling of the writer, such as location (state, city), age, and the like.

In a particular implementation, a writer initially registers with content streaming system 20 to obtain or provide a unique user identifier and, subsequently, logs in to the system when desiring to submit comments in connection with a given live or real-time multimedia streaming event. As part of the registration process, the writer may provide tags that relate to them or their perspectives. Comments submitted by the writer can be transmitted in discrete messages or datagrams transmitted to content streaming system 20. Browser cookies, or other suitable technologies, can be used to automatically append, to the submitted comments, the writer's identifying information and even the tags associated with the writer.

B.2. Readers

Readers are users that simply view the comments that are provided by content streaming system 20 in connection with the underlying multimedia content. As discussed herein, readers may configure comment filters by selecting one or more tags or other attributes relating to the comments themselves or the writers that submitted the comments. The comment filters control the display of comments to a given reader. A comment filter engine, in one implementation, controls the display of comments. This comment filter engine can be executed centrally at content streaming site 20, or in a distributed manner. Specifically, in a distributed system, content streaming system 20 could simply broadcast all comments submitted by writers (appending one or more tags associated with the respective writers), and have comment filter engines at client systems perform the filtering steps. As discussed above, a given user can assume both roles concurrently.

In one possible embodiment, readers also register or log in to content streaming system 20. This allows content streaming system 20 to possibly tailor or customize the reader's experience. For example, content streaming system 20, based on analysis of a profile or demographic information associated with the reader, may suggest or present available comment filter configurations that may be of interest. For example, content streaming system 20 may present a "California" demographic filter to a reader, if the content streaming system 20 detects that the reader is a Californian or access the content streaming system 20 from a location in California. Other filter attributes can be suggested such as a "Democrat," "Republican" or "Green" comment filter configuration. Furthermore, registration and log in allows a reader to save comment filter configurations for future use in connection with subsequent streaming events.

C. User Interfaces

The following illustrates example user interfaces that may support writer and reader roles according to one possible implementation of the invention. The user interfaces described herein can be provided by content streaming system, and execute within the context of a client application, such as a browser client application. In such implementations, web technologies and protocols, such as HyperText MarkUp Language (HTML), JavaScript, extensible MarkUp Language (XML), HyperText Transport Protocol (HTTP), Real Time Transport Protocol (RTP), Real-Time Streaming Protocol (RTSP), and others, can be used to implement the functionality described herein. In other implementations, the user interfaces may be provided by a special-purpose client application.

C.1. Writer Interface

Figure 2:
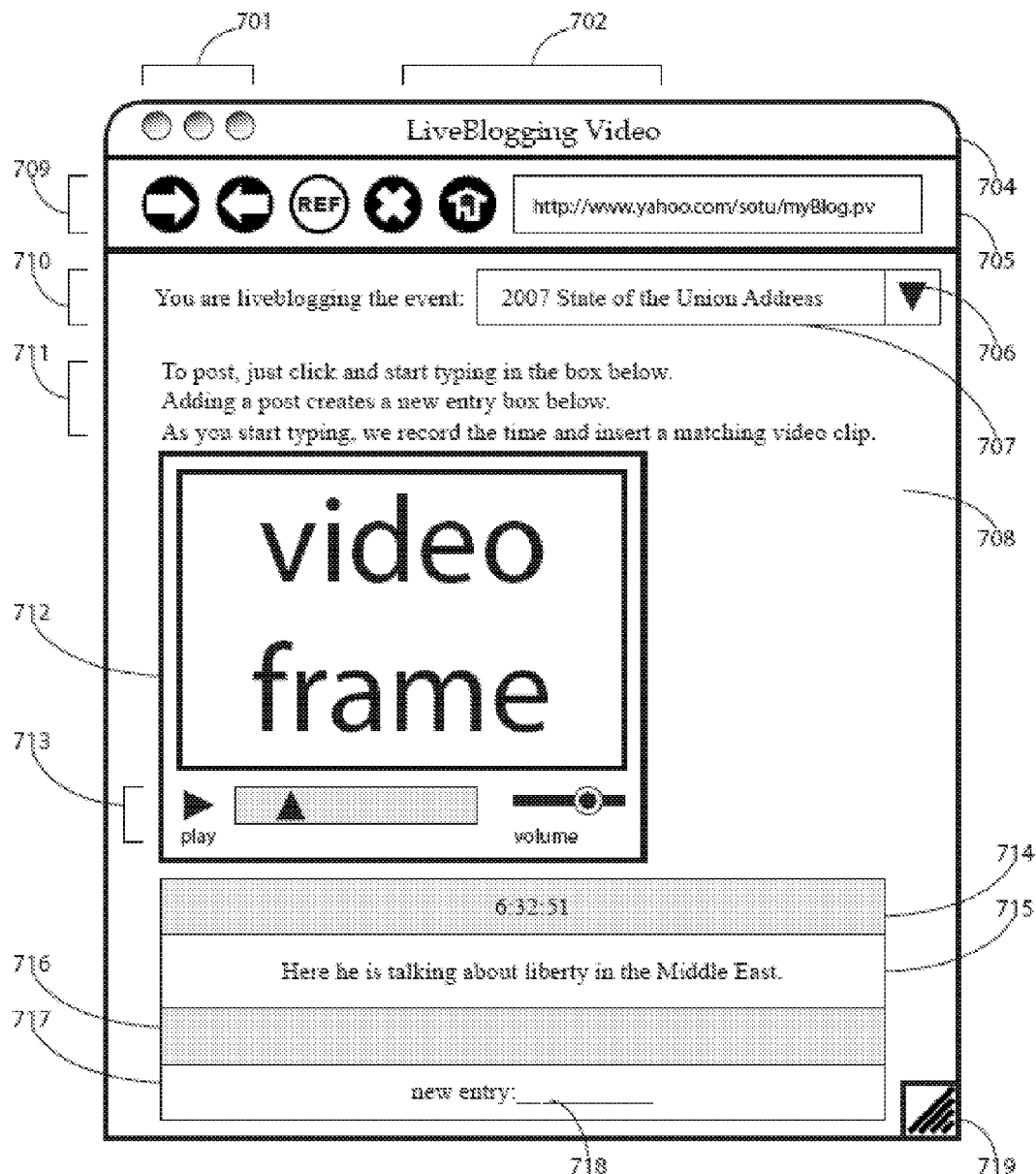

In FIG. 2, an interface window for a user composing comment entries while observing a video broadcast is shown. The video broadcast may be transmitted over the network by a separate system, may be distributed by an event server of content streaming system 20, or may be distributed by cable or other transmission means independent of content streaming system, such as cable, satellite, and other systems. Furthermore, the media player and writer and reader controls and interfaces can be served by independent network systems. The interface window contains a window control bar 704, a browser control bar 705, and a main window area 708. The window control bar contains a window title 702 and buttons 701 to close, minimize, or resize the window. The browser control bar 705 contains typical button controls for a browser, including, from left to right, a forward button, a back button, a refresh button, a stop button, and a home button. The browser control bar also includes a text entry area where the user can enter the URL of a website to be accessed. In the example, the user is accessing the website "http://www.yahoo.com/sotu/myBlog.py" to create a live blog of a video broadcast.

The top of window area 708 contains a control area 710 to select a video broadcast. In a preferred embodiment, one or more video broadcast servers publish a list of video broadcasts that a writer may view and participate in comment writing. A default broadcast is displayed in text area 707. In one implementation, a control such as black triangle 706 allows the user to invoke a pull-down menu of available video broadcasts. In such an implementation, the user clicks on the triangle, the pull-down menu appears, and the user drags the indicator through the pull-down menu list until a desired selection is reached. The selected broadcast is displayed in updated text area 707.

A video stream for the selected video broadcast is streamed to the video player interface 712 embedded in window area 708. The video player interface 712 contains a control section 713 with a leftmost black triangle to indicate the video is playing. A two-dimensional image of a current video frame occupies the large rectangular area at the top of interface 712. In one implementation, a user clicking on the black "play" triangle initiates an interactive control to pause the video. A gray rectangular area denotes the anticipated timeline of the video, and the relative position of the video frame in the video stream is indicated by the black triangle enclosed in the grey rectangular area. A volume control slider may be implemented to control the volume of an audio stream accompanying the video stream. The audio stream is typically decoded and output through a user's headphones or computer speakers (not shown).

In one example implementation, the broadcast video stream is partitioned into relevant video clips or segments as commonly conceived by the viewing public. The partitioning may be performed automatically or manually. Automatic partitioning may be implemented by detecting changes in video frames, certain audio sounds, metadata embedding in the video stream, images embedded in the video stream, and/or video program breaks. For example, if the video stream is a broadcast football game, the video stream may be partitioned into clips corresponding to football plays, or if the video stream is a political speech, the video may be partitioned into clips dealing with particular topics, or may be partitioned into clips separated by audio portions of applause. The stream partitioning may occur automatically, or may be performed manually by an employee-editor of the blog service provider. The time duration of each video clip constituting the video stream is determined, and an appropriate video clip containing the user's time-stamp is linked with the user's personal blog in a background process.

An Asynchronous JavaScript and XML (AJAX) process may be invoked to provide a means for a writer to provide new comment text entries. Window area 708 contains an instruction area 711 to instruct the user. Whenever the user posts a textual comment, the starting time of the text entry is associated with the comment entry as a time-stamp. In the example interface, the user posted a most recent comment, "Here he is talking about liberty in the Middle East," with the time-stamp 6:32:51. The time-stamp is displayed in window area 714 and the associated comment follows in window area 715. In a particular implementation, the comment and a video clip or segment containing the time-stamped video frame are automatically posted in the writer's personal blog. One or more readers may observe the posted entries of this and other writers in real time (or an offline mode) in synchronicity with the video broadcast as explained further below. A third user may later access the user's personal blog to read the user's comments and observe recordings of the time-aligned video clips.

The user may enter new comment text in window area 717. Window area 717 contains a new text entry area 718 where the user clicks and starts typing. When text is initially entered, a time-stamp is stored. As the text is entered, it appears in window area 718. When a text line is complete, the user signals completion with a "return" or "enter" character. The AJAX process causes the comment text entry to be submitted to content streaming system 20, and creates another text entry area 718. The text entry becomes the most recently posted comment entry, and window areas 714, 715, and 717 are refreshed. The new time-stamp appears in window area 714, the new text entry appears in area 715, and the new text entry area 718 is cleared.

In an alternate embodiment, the broadcast audio/video stream is automatically partitioned into a plurality of equal time segments. For example, in one implementation a default video clip associated with a time-stamped blog text entry may consist of an adjustable time segment during which the text entry was made, for example by automatically saving a video clip including the previous n seconds of video and the following n seconds of video, where n may be assigned a default value or may be adjusted as a user preference. In another implementation, a video broadcast may be parsed into video clips by automatically detecting one or more attributes of the audio/video broadcast. In a political speech, for example, sub-topics may be separated by detectable applause or cat-calls in the audio stream. Alternatively, facial recognition techniques allow analysis of a video stream to determine when a person is speaking.

As mentioned previously, writer comment entries may be automatically time-stamped and stored in the writer's personal blog, which is available over the network for later access. In addition, associated video clips from the commonly observed video stream are included in the writer's personal blog as well. In one implementation, an approximate video segment is determined from the time-stamp and one or more attributes of the broadcast video stream.

C.2. Reader Interface with Comment Filter Controls

Figure 3:
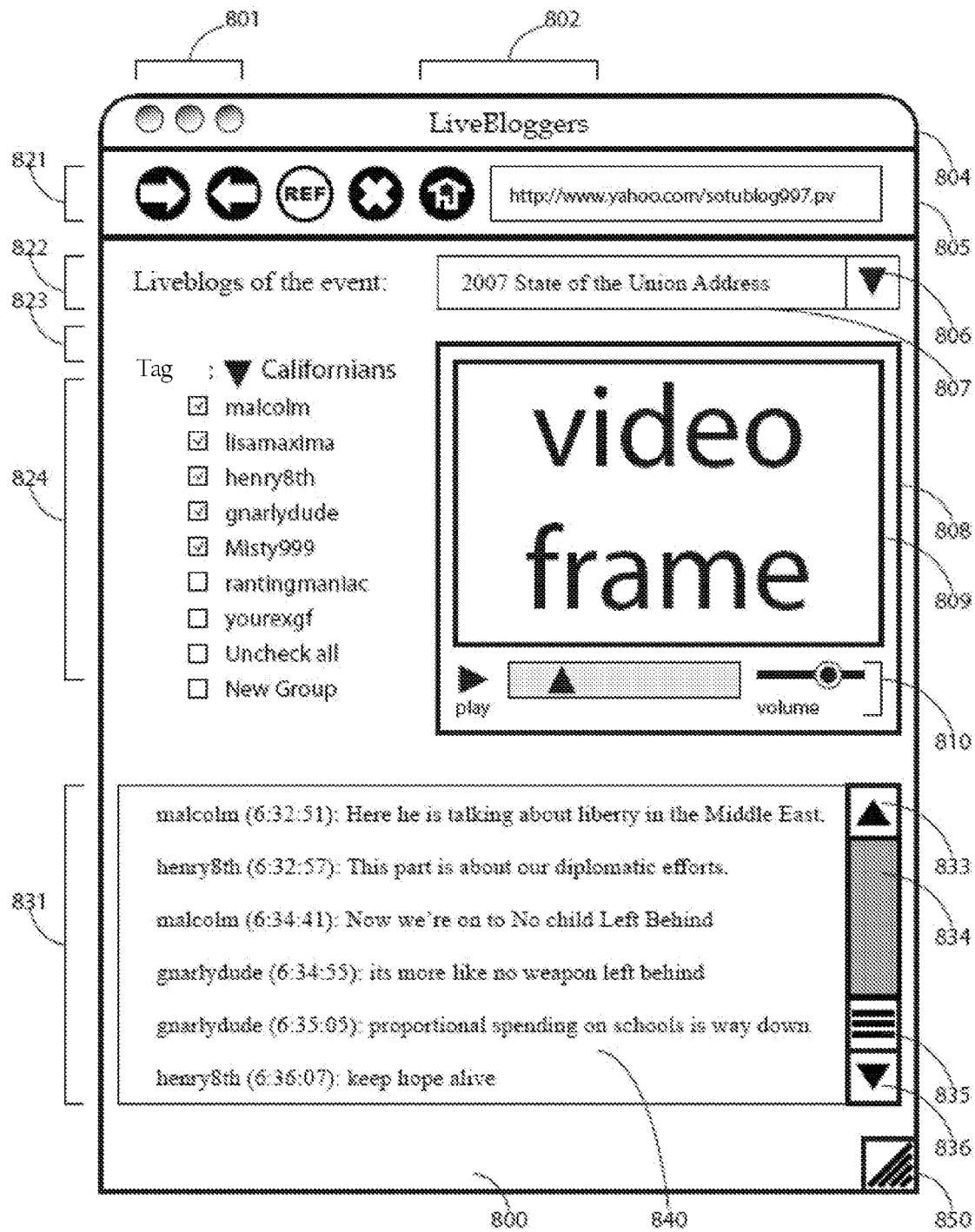

FIG. 3 illustrates a graphical user interface that displays a video and a comment stream. The interface window contains a window control bar 804, a browser control bar 805, and a main window area 800. The window control bar contains a window title 802 and buttons 801 to close, minimize, or resize the window. The browser control bar 805 contains button controls and a URL entry area. Main window area 800 contains broadcast selection area 822 with broadcast text area 807 and selection control 806. The video stream for the video broadcast received from content streaming system 20 is rendered in window area 808, and contains a stream of video frames including a current video frame 809 and video player controls 810.

In scrollable comment history area 831, the most recent comments entries from writers are posted. In a particular implementation, an AJAX process can be used in a push or pull mode to receive comments from content streaming system 20 and post the comments in comment history area 831. Each comment entry appears with a user identifier, a time-stamp for the entry, and the text of the entry. When the recent comment entries exceed the capacity of the window area 840, a scrollable history may be implemented, such as by using slider controls 833-836. A user clicking on up 833 or down 836 arrow returns to previous or later comment entries. The user may alternatively click and drag slider 835 to traverse the history of comment entries represented by grey area 834. The user may also resize the interface window by dragging corner slider 850.

FIG. 3 also illustrates that a reader may also configure a comment filter that controls the display of comments in window 840. In the example interface of FIG. 3, the reader has selected a demographic attribute (Californian's). Additional filter attributes can also be specified. For example, as FIG. 3 provides, a reader may also select or de-select one or more users as shown in region 824 of the user interface. Configuration of a comment filter in the manner illustrated causes comments submitted only by the selected writers to be shown in comment window 840.

As discussed above, the comment filter processes may be executed locally relative to the client system. In another implementation, the comment filter configuration information may be transmitted to content streaming system 20, which implements the comment filter process remotely and provides only filtered comments to the clients. In such an implementation, an AJAX process can transmit the comment filter configuration created by a reader to the content streaming system 20 when it is initially configured and subsequently changed during the multimedia broadcast.

The interfaces and controls that facilitate configuration of comment filters may vary considerably. For example, a comment filter configuration interface may simply include a text entry area into which a user may specify one or more tags or keywords. In other implementations, the comment filter configuration interface may include a field for keywords that apply to the comments themselves, and a second field for tags and keywords that are applied to the writers. As illustrated above, other configuration interfaces can group writers along various demographic or keyword axes. In addition, the comment filters can also be configured to filter comments based on formatting (such as comment text in all capitals letters). Still further, the keywords or tags can include string matching. Furthermore, comments can also be filtered based on ratings associated with the writer. In such an implementation, a reader can filter all comments except those of writers having at least a threshold rating. The rating can be a community based rating where the rating is an aggregate of individual ratings of a plurality of readers.

Other user interfaces are possible. In FIG. 4, an expanded interface window for a user consuming live comment entries while observing the video broadcast is shown. The expanded interface allows a writer to post entries while observing other writers' comment entries. The interface combines the elements of FIG. 3 with a blog entry area 901-903. The title "blog entry for my blog" in area 901 indicates the text entry area below it. Text is entered in section 903 of area 902. In this manner, the user may effectively comment interactively on the broadcast with a plurality of other users in real time. As mentioned previously, in one implementation the interactive commentary may be saved and used to automatically generate a composite interactive blog.

Still further, FIG. 5 illustrates an expanded comment filter interface that allows a reader to browse a set of tags. Writers may be grouped automatically based on analysis of the same tags and related tags. In FIG. 5, an example browser user interface window is illustrated. The interface may be included, in one implementation, as a browser pop-up window as illustrated. The interface provides an optional means for a user to manually select a tag, and/or manually filter individual writers associated with a tag. Referring to FIG. 5, window control bar 503 contains a window title 502 and control buttons 501 to close, minimize and resize the window. The window contains a customizable toolbar 504 with representative assorted control buttons 511 including a user control button, a tag control button, a message control button, a video control button, and a mail control button. The main window portion 510 contains information about current writer tags for the user, and optionally, information about other users associated with the tag. By clicking on the black triangle of area 512, the user expands or contracts a list of the tags. In one implementation, a currently selected tag is shown by default, and additional tags are displayed by clicking on the triangle to list other tags as shown in list 513. Each listed tag is placed in proximity to an indicator icon. The center of the icon for "Californians" is black to illustrate that the user has currently selected that tag, while the other remaining tag icons remain empty, each indicating a potential alternative tag. In one implementation, user title area 514 provides a means to optionally list the writers associated with a tag. By clicking on the black triangle of area 514, the user is able to expand or contract the list of writers. The first five members of associated with "Californians" are enabled, as indicated by the highlighted icons 515. Writer "Billy Bonkers" has been disabled, as illustrated by empty icon and list entry 516. In one implementation, the list of writers 517 is sorted and enabled writers appear at the top of the list as shown.

D. Comment Filtering

Comment filtering can be implemented in a centralized or distributed fashion. As discussed above, an AJAX or other process executing on a remote client host may maintain an open connection with a comment distribution server over which comments are transmitted. Comment filtering can occur at the content streaming system 20, at the remote client host, or at both locations in a multi-stage filtering process.

In a particular implementation, a comment entry server of content streaming system stores received comments in a comment processing queue or buffer that is associated with the particular live streaming event. In one implementation, the comment entry server may sort entries in the queue or buffer based on the time stamps associated with individual comment entries. A comment distribution or filter engine may process comments in the comment processing queue or buffer.

As discussed above, in a centralized processing architecture, a comment distribution server of content streaming system 20 would, for each reader, filter comments stored in the comment processing queue or buffer. FIG. 6 illustrates an example filtering method that may be implemented as a process or thread by the comment distribution server. In the illustrated method, the comment filter thread may access a buffer of received comment entries and iteratively process them (602). As to each comment entry, the thread applies the comment filter configured by the reader (604). If the comment passes the comment filter (606), the comment filter thread provides the comment to the reader (608). The comments can be provided to the reader by pushing the comment over an open connection with a client-side script or process. In another implementation, the comment can be placed on a comment transmit buffer. The client-side process may, in a pull process, poll the comment distribution server for comment entries at a regular interval. The comments stored in the comment transmit buffer can be transmitted in response to the polls.

In other implementations, the comment filtering process can be executed at the remote client host. In such an implementation, the comment distribution server can simply broadcast or multicast all comments received in connection with a given streaming event to the remote clients. The remote clients can process the comments against the configured filters using the illustrated method above. In another implementation, the comment distribution server can perform a first stage filtering process (such as filtering by tags associated with writers), while a client side process can perform a second stage filtering process (such as filtering by individual writers associated with tags, or filtering by keywords of the comments themselves).

E. Example Computing System Architectures

While the methods and systems of the present invention have been described above with reference to specific embodiments, some or all of the elements or operations thereof may be implemented using a computer system having a general purpose hardware architecture. FIG. 7 illustrates an example computing system architecture, which may be used to implement the above described embodiments, which may be used to perform one or more of the processes or elements described herein. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location server 22, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist, with the components of hardware system 200 being coupled to the single bus. Furthermore, hardware system 200 may include additional components, such as additional processors, storage devices, or memories.

As discussed below, in one implementation, the operations of one or more of the physical servers described herein are implemented as a series of software routines run by hardware system 200. These software routines comprise a plurality or series of instructions to be executed by a processor in a hardware system, such as processor 202. Initially, the series of instructions may be stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. Of course, other implementations are possible. For example, the server functionalities described herein may be implemented by a plurality of server blades communicating over a backplane.

The present invention has been explained with reference to specific embodiments. For example, while embodiments of the present invention have been described as operating in connection with AJAX and HTTP, the present invention can be used in connection with any suitable protocol environment. Other embodiments will be evident to those of ordinary skill in the art. It is therefore not intended that the present invention be limited, except as indicated by the appended claims.

What is claimed is:

1. A method comprising
    receiving a set of attributes from a first reader, the attributes characterizing one or more preferences for comment entries from one or more writers;
    receiving, concurrently with a broadcast of a multimedia stream, the comment entries related to the multimedia stream;
    filtering the related comment entries based on the set of attributes; and
    providing the filtered comment entries to the first reader concurrently with the broadcasting in a user interface.

2. The method of claim 1 further comprising broadcasting the multimedia stream to a plurality of readers.

3. The method of claim 1 wherein the multimedia stream comprises video data.

4. The method of claim 1 wherein the set of attributes comprises tags corresponding to a writer.

5. The method of claim 1 wherein the set of attributes comprises a user name.

6. The method of claim 1 wherein the set of attributes comprises tags corresponding to a comment entry.

7. The method of claim 1 further comprising providing, in the user interface, identifiers of the writers associated with the comment entries displayed in the user interface.

8. The method of claim 7 wherein the user interface allows for selection and de-selection of the writers.

9. The method of claim 1 wherein the user interface facilitates composition and submission of comment entries.

10. An apparatus comprising
    a memory;
    one or more processors;
    logic encoded in one or more tangible media for execution and when executed operable to cause the one or more processors to:
        receive a set of attributes from a first reader, the attributes characterizing one or more preferences for comment entries from one or more writers;
        receive, concurrently with a broadcast of a multimedia stream, the comment entries related to the multimedia stream;
        filter the related comment entries based on the set of attributes; and
        provide the filtered comment entries to the first reader concurrently with the broadcasting in a user interface.

11. The apparatus of claim 10 wherein the logic is further operable to cause the one or more processors to broadcast the multimedia stream to a plurality of readers.

12. The apparatus of claim 10 wherein the multimedia stream comprises video data.

13. The apparatus of claim 10 wherein the set of attributes comprises tags corresponding to a writer.

14. The apparatus of claim 10 wherein the set of attributes comprises a user name.

15. The apparatus of claim 10 wherein the set of attributes comprises tags corresponding to a comment entry.

16. The apparatus of claim 10 wherein the logic is further operable to cause the one or more processors to provide, in the user interface, identifiers of the writers associated with the comment entries displayed in the user interface.

17. The method of claim 16 wherein the user interface allows for selection and de-selection of the writers.

18. The apparatus of claim 10 wherein the user interface facilitates composition and submission of comment entries.

19. A system comprising
a media streaming system operative to:
- receive a first set of attributes from a first reader, the attributes characterizing one or more preferences for comment entries from one or more writers;
- receive, concurrently with a broadcast of a multimedia stream, the comment entries related to the multimedia stream;
- filter the related comment entries based on the first set of attributes; and
- provide the filtered comment entries to the first reader concurrently with the broadcasting in a user interface; and a client system operative to:
- render the multimedia stream;
- receive the filtered comment entries from the media streaming system;
- filter the received comment entries against a second set of attributes;
- render the filtered comment entries in proximity to the multimedia stream.

20. The system of claim 19 wherein the multimedia stream comprises video data.

21. The system of claim 19 wherein the first set of attributes comprises tags corresponding to a writer.

22. The system of claim 19 wherein the second set of attributes comprises a user name.

* * * * *